INVENTORS
EDMOND M. DELORAINE
HENRI G. BUSIGNIES
BY R. H. Morris
ATTORNEY

INVENTORS
EDMOND M. DELORAINE
HENRI G. BUSIGNIES
BY R. P. Morris
ATTORNEY

United States Patent Office 2,931,031

Patented Mar. 29, 1960

2,931,031

RADIO REPEATING SYSTEM

Edmond M. Deloraine, New York, and Henri G. Busignies, Forest Hills, N.Y., assignors to International Telephone and Telegraph Corporation, a corporation of Maryland Application August 28, 1942, Serial No. 456,498

6 Claims. (Cl. 343—18)

This invention relates to radio systems and more particularly to radio systems for falsely simulating the reflection characteristics of extensive conductive bodies with respect to an arriving succession of impulses. In our previous copending application, Serial No. 436,846, filed March 30, 1942, entitled "Radio Repeater," is disclosed an arrangement wherein a repeater mounted on a mobile unit such as a balloon or a raft is used to receive from and retransmit to signals from an obstacle detecting system to produce a false simulation of a large conductive body. In systems such as described in the above-mentioned application, the repeater apparatus must be previously tuned to the carrier frequency of the obstacle detection system since no control is retained over the equipment once it has been released.

It is a principal object of this invention to provide remotely located reflection simulating apparatus and remote control equipment for adjusting the receiving characteristics of the repeater system.

It is a further object of this invention to provide a system for comparing the signals transmitted from a radio obstacle detection arrangement with the signals transmitted from a false simulation system to determine necessary adjustments and then to transmit remote control signals to produce the desired adjustments.

It is a still further object of our invention to provide a system for continuously controlling the tuning or other characteristics of a remotely located repeater so that it will continuously follow changes in frequency or other characteristics of a transmitting system of an obstacle detection arrangement.

It is a still further object of our invention to provide repeater systems capable of continuous operation over a relatively wide variable frequency band.

A better understanding of our invention and the objects and features thereof may be had by reference to the accompanying drawings, in which;

Fig. 1 schematically illustrates a complete radio system in accordance with this invention with the circuits in block diagram;

Figure 1:
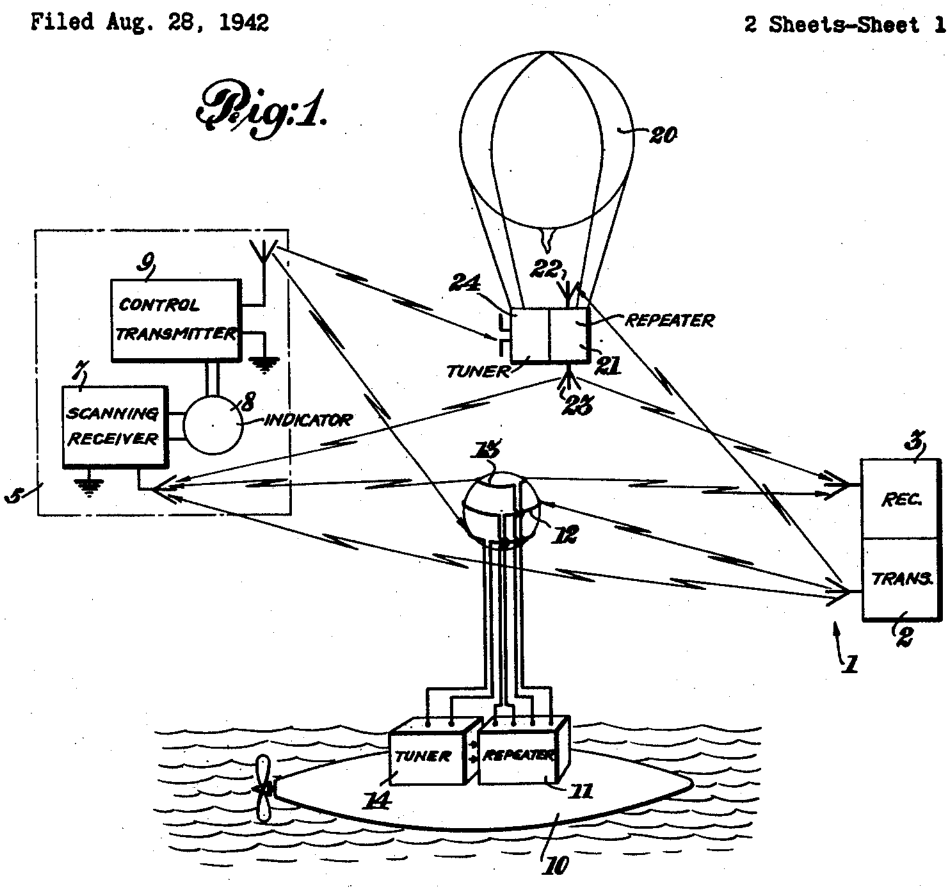

Turning first to Fig. 1, the obstacle detecting apparatus is shown generally at 1 and comprises a transmitter 2 and receiver 3. The transmitter 2 is normally adapted to transmit a series of relatively widely spaced pulses which after reflection from a conductive body, are received on receiver 3. The output of receiver 3 is normally used to operate some form of distance detecting apparatus so that obstacles may be readily detected at the receiver. Such obstacle detection apparatus is commonly used for the location of ships or aircraft. A purpose of the present invention is to provide apparatus simulating the reflection effects of ships or aircraft so that an enemy station of the form shown in Fig. 1 cannot readily locate the position of the craft.

At an intercepting station 5 which may be located on board one of the ships of a convoy or a bomber plane or at some fixed land station is provided a scanning receiver 7. This scanning receiver operates continuously to tune receiver 7 over a band of frequencies so that the pulses sent out by transmitter 2 may be readily detected. Any known form of frequency scanning receiver may be provided, for example, the receiver may be of the type generally disclosed in the copending application of Emile Labin, Serial No. 451,302, filed July 17, 1942, entitled "Radio Transmission and Monitoring System," now Patent No. 2,412,991. The indications of the shape and frequency of the pulse may be determined by indicator 8 in the output of receiver 7. Upon determination of the frequency of the obstacle locating apparatus buoyant mobile craft such as the propeller float 10 or the balloon 20 may be released. In both of these arrangements are provided repeater equipments 11 and 21 respectively, tuned to the frequency of the signals from transmitter 2. At the repeater, signals from transmitter 2 are received on antennae 12 and 22, respectively, and are retransmitted after a suitable delay from antenna elements 13 and 23, respectively. These signals will appear at the receiver 3 as pulses simulating reflective impulses in accordance with the system described in the previous invention, application Serial No. 436,846.

However, should the tuning or spacing of pulses from transmitter 2 be changed the repeated pulses from 10 and 20 would no longer properly simulate the reflection impulses. Accordingly, at interceptor station 5 we provide a control transmitter 9 which serves to transmit control signals to adjust the tuning of repeaters 10 and 21 upon change of tuning of transmitter 3. To accomplish this, tuning adjusters 14 and 24 are provided at repeaters 10 and 20 to receive the signals from the control transmitter 8 and adjust the tuning of the repeater in any well known manner to the desired frequency. To facilitate the control of the tuning, repeated signals from 11 and 21 may be received at scanning receiver 7 and compared on indicator 8 with the pulses from transmitter 3. From the comparison of these pulses the desired adjustment of control transmitter 9 is accomplished so that tuners 14 and 24 may be properly adjusted.

Figure 5:
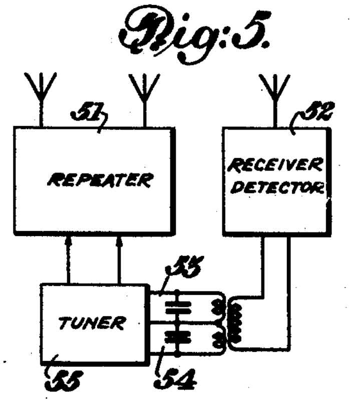
Fig. 5 is a block circuit diagram of still another form of repeater in accordance with our invention.

Many different forms of remote tuning control for adjusting a transmitter or receiver are known and any of these known systems may be utilized in the devices 10 and 11. However, in order to give a better understanding of the invention, a few types of repeater systems are illustrated in Figs. 2, 3 and 5.

Figure 2:
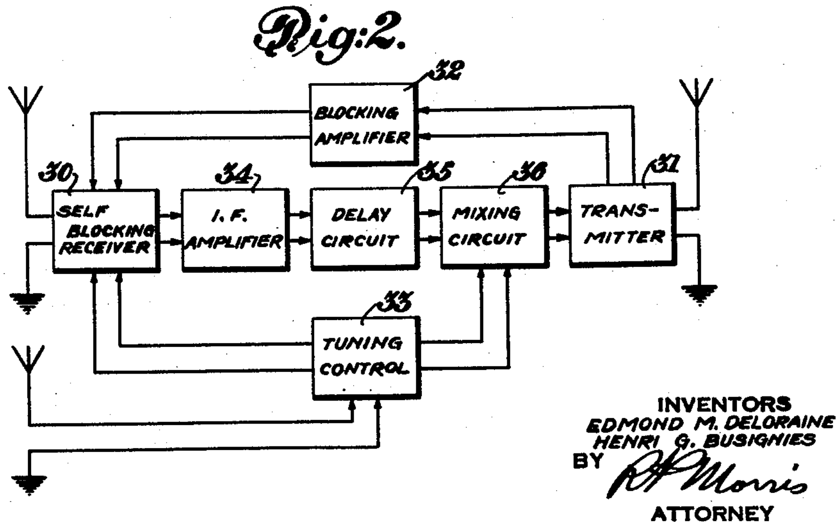
Fig. 2 is a block circuit diagram of one form of repeater suitable for use in the system of Fig. 1.
Figure 3:
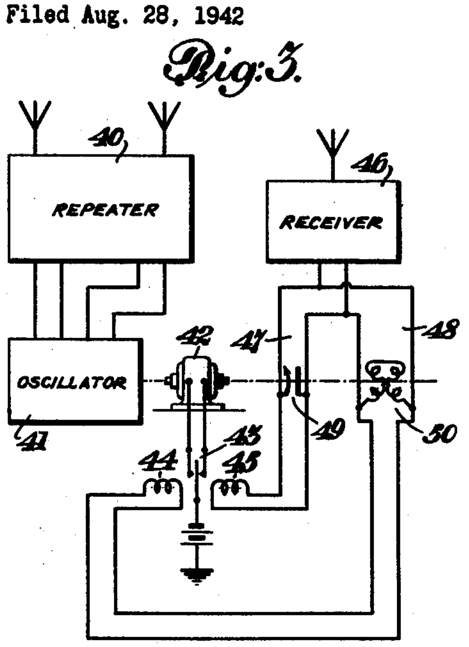
Fig. 3 is a block circuit diagram of still another form of repeater for use in the system of Fig. 1.

Turning to Fig. 2, the repeater equipment is shown as consisting of the heterodyne receiver 30 preferably of the self blocking type so that it will block itself for a predetermined period of time upon receipt of a signal. Such a receiver equipment used in a repeater is disclosed in the copending application of E. M. Deloraine and E. Labin, entitled "Radio Guiding Method and System," filed August 28, 1942, Serial No. 456,500, now Patent No. 2,441,956. This blocking should be of sufficient duration to assure that the receiver will not respond to signals transmitted from transmitter 31 of an adjacent repeater so that the system will not start to sing. A blocking amplifier 32 may be provided to block the receiver at all times while transmitter 31 is in operation when self blocking is not provided. Blocking for a period of time greater than that needed for its own transmitter may be desirable because of signals repeated from other simulating stations. Accordingly, it is preferable to provide for blocking of the receiver a sufficient length of time to assure that signals from other closely spaced mobile repeaters are not effective in the system. If the mobile repeaters are widely spaced one from another the repeated signals will generally be too weak to trigger the receiver since the field of the repeater transmitter is relatively weak.

Tuning control 33 is provided and preferably consists of a means for supplying beating frequency to receiver 30 to reduce the received signals to a suitable intermediate frequency. This intermediate frequency is then amplified in intermediate frequency amplifier 34 delayed for a desired time in delay circuit 35 and then applied to a mixing circuit 36 where the signal is also mixed with energy from tuning control 33 to restore it to the original received frequency. From mixing circuit 36 the energy is applied to repeater transmitter 31 and is rebroadcast. The rebroadcast pulse is preferably of such an amplitude as to simulate reflection from a ship or other extensive reflecting surface.

Preferably, the energy from the control transmitter 9 is on an ultra high frequency wave band so that the control signals will not serve as a guiding radiation for enemy craft to indicate the location of the observation station. When these ultra short waves are used, control of the repeaters, if they are floating on the water, will not be possible beyond a distance determined by the curvature of the earth. This will probably be not more than 8 to 15 miles on the surface of the sea. However, when balloons are used as shown at 20 in Fig. 1 control may be maintained for a much greater distance because of the higher elevation of the repeaters. In such cases it may be desirable to broadcast directly from control transmitter 9 a frequency for beating with the received signals at 30 to produce the desired intermediate frequency. Since the control frequency, however, is generally much higher than the transmitted signal it may be necessary to transmit the control beating frequency as a modulation of a high frequency carrier. In this case tuning control means need be only a detector for detecting the carrier frequency so as to produce the desired beat frequency for application to the receiver 30 and mixing circuit 36. If the beat frequency is transmitted directly then tuning control 33 may be merely a broad band amplifier for amplifying this signal before application to receiver 30 and transmitter 31.

Although the direct transmission of a control intermediate frequency may be provided as described above this system has the drawback that once the repeater has traveled out of the control area of the control station it will no longer function since no beating frequency will be supplied. It may be, therefore, preferable to provide means for tuning an oscillator in accordance with transmitted signals so that the repeaters will continue to operate at the frequency at which they are last tuned even after they have left the control range of the interceptor station. For this purpose a system such as shown in Fig. 3 may be used. The repeater station 40 may be similar to that illustrated in Fig. 2 with the receiver intermediate frequency amplifier delay circuit and retransmitter. A control or tuning oscillator is provided at 41. This oscillator 41 produces the beat frequency for control of the repeater in the manner described in connection with Fig. 2. The oscillator, however, is tuned by means of a motor 42 driven in either of two directions by means of a reversing switch 43. Reversing switch 43 is operated in its two positions by means of balanced relays 44, 45 controlled by the signals from the control receiver 46.

To facilitate the control of the modulator, the output of receiver 46 is coupled to two circuits 47 and 48.

Figure 4:
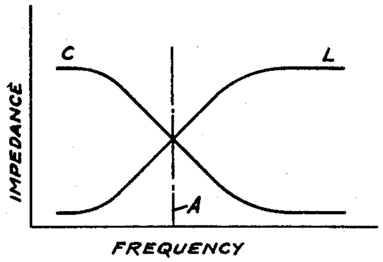
Fig. 4 is a set of curves serving to explain the operation of the system of Fig. 3.

Circuit 47 is capacitively reactive and has an impedance curve illustrated by C of Fig. 4 adjusted by means of condenser 49. Circuit 48 is inductively reactive and has an impedance curve L, Fig. 4, controlled by means of variable inductance 50. As a consequence the received signal at 46 will be applied over circuits 47 and 48 to control relays 45 and 44, respectively. If the signal is not at the center point indicated by line A of Fig. 4 then one of the relays 44 or 45 will predominate the other causing closure of switch 43 in the corresponding direction. The energy in relay 45 will predominate if the frequency is lower than indicated at A and 44 will predominate if the energy is higher in frequency than indicated at A. Accordingly, switch 43 will be moved into a position to operate motor 42 until balance is restored by the operation of variable condenser 49 and inductance 50. In this way oscillator 41 will be tuned to the proper frequency for repeating the signals.

It should be understood that motor 42 instead of operating an oscillator for beating with the received signals in repeater 40 may, if desired, directly operate the tuning of the repeater. It is clear that with the arrangement of Fig. 3, the repeater will be tuned to the desired frequency and this adjustment in tuning may be made to follow any changes in the enemy transmitted frequency as long as the variation does not exceed the response range of the system. At the same time, once the repeater leaves the control area of the control transmitter the system will remain tuned to the last frequency at which it was operated. Thus, if there is no change in the energy signal the repeater may serve to interfere with their distance determining apparatus long after it is out of the range of the control station.

In Fig. 5 is illustrated an alternative type of repeater. In this system the repeater 51 may be similar to that disclosed in Figs. 2 and 3 or may be of any variable tuning type. The transmitted control signal may consist of a carrier modulated with two different frequency signals which may be alternatively applied to tune the repeater up or down in frequency. The receiver detector 52 serves to receive the control signals and to detect this signal to derive therefrom control frequencies. These two frequencies derived at the output of receiver detector 52 are applied over selectively tuned circuits 53, 54 to tuning control means 55. Tuning control means 55 may consist of a motor such as shown in Fig. 3 or any other suitable remote control apparatus, such as a step-by-step switch or other tuning circuits commonly used in remote control receiver tuning. If the signal coming over circuit 53 predominates, the tuning will be in one direction, while if the signal is such as to be applied primarily over circuit 54, the repeater will be tuned in the opposite direction. Thus, the tuning of the repeater may be permanently accomplished so that should the repeater leave the controlled area it will still remain in operation.

Figure 6:
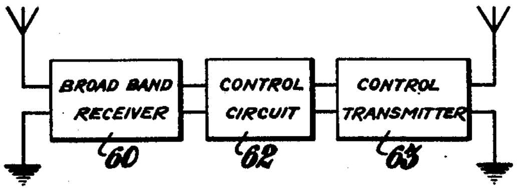
Fig. 6 is a block circuit diagram of an alternative control arrangement for use in connection with the system of Fig. 1.

In Fig. 1 the control station is shown with separate and independently controlled receiver and transmitter units. Accordingly, in this arrangement the adjustment of the control transmitter for remotely controlling the tuning of the receivers must depend upon manual adjustment of the control transmitter 9. If it is desired to follow closely the tuning of the enemy transmitter, it may be difficult to adjust manually the control transmitter at a sufficiently high rate of speed. Accordingly, at the control station an arrangement such as illustrated in Fig. 6 may be provided. In this system a broad band receiver is shown at 60 which is preferably of sufficient range to cover the normal frequencies to be used by the enemy. This broad band receiver may serve to produce a control frequency dependent upon the frequency received and operate a control circuit 62 which may, for example, comprise a control circuit similar to that shown in Fig. 3. This control circuit 62 will then operate control transmitter 63 to tune it to the desired frequency for transmitting signals to the repeated apparatus. Transmitter 63 may be a high frequency carrier transmitter modulated by a controlling frequency which is adjusted in accordance with the signals received in receiver 60. Furthermore, if desired, control circuit 62 may be of some type which is adjusted in some other way by means of the signals received at 60.

While we have described the system throughout as an arrangement for adjusting the tuning of repeaters, it is clear that other controls such as adjustment of the shaping of the repeated signal may be operated as well by the remote control system herein described. Also the control transmission period may be adjusted by remote means in the manner similar to that described above. It is clear that any control which may be manually operated at a repeater station may be remotely positioned by the system outlined in the present application. Furthermore, the system has been described throughout without reference to the number of pulses retransmitted. It is clear that, if desired, the system may be made to transmit a plurality of delayed impulses in the manner disclosed in the copending application of Edmond M. Deloraine and Henri G. Busignies, Serial No. 453,668 filed August 5, 1942, entitled "Radio Receiving and Transmitting System."

While we have described particular embodiments of our invention in order to fully explain the operation of the system, it should be distinctly understood that this description is given merely by way of illustration and is not intended to limit the scope of the invention as defined in the appended claims.

What is claimed is:

1. Apparatus for simulating the reflection characteristic of an extensive conductive body with respect to an arriving succession of pulses incoming at a predetermined carrier frequency which comprises repeater means remotely positioned from said conductive body for receiving said succession of pulses and transmitting impulses in response thereto, tuning means at said repeater means for coordinating the tuning of the transmitter and receiver means of said repeater means, and tuning control means remotely positioned from said repeater means for adjusting said tuning means to said predetermined carrier frequency whereby the pulses retransmitted from said repeater means have characteristics corresponding to the pulses reflected from said extensive conductive body, thereby providing a simulation of the reflected pulses.

2. Apparatus according to claim 1, further comprising a receiver means adjacent said control means for receiving the succession of pulses and determining the carrier frequency thereof, and means operatively associating said receiver means and said control means.

3. A system according to claim 1 wherein said repeater comprises a heterodyne receiver, an intermediate frequency system, a mixing circuit for raising said intermediate frequency to the carrier frequency and a transmitter for transmitting said signals, and said tuning means comprises a system for supplying energy differing from said carrier frequency by said intermediate frequency for application to said receiver and said mixing circuit, and said remote control transmission means comprises a variable frequency source for transmitting energy to said tuning means.

4. A system according to claim 1 wherein said repeater comprises a heterodyne receiver, an intermediate frequency system, a mixing circuit for raising said intermediate frequency to the carrier frequency and a transmitter for transmitting said signals, and said tuning means comprises a system for supplying energy differing from said carrier frequency by said intermediate frequency for application to said receiver and said mixing circuit, and selective means for selecting a given characterized wave for adjusting said system to the desired frequency, and said remote control transmission means comprises means for transmitting radio frequency energy with given characteristics to control said selective means.

5. A system according to claim 1 wherein said repeater comprises a heterodyne receiver, an intermediate frequency system, a mixing circuit for raising said intermediate frequency to the carrier frequency and a transmitter for transmitting said signals, and said tuning means comprises a system for supplying energy differing from said carrier frequency by said intermediate frequency for application to said receiver and said mixing circuit, and means continuously responsive to a control wave of given characteristics for controlling said tuning means, said remote control transmission means being provided with a control circuit responsive to said pulses received at said analyzing means for giving to said transmitted waves the desired controlling characteristics.

6. A method of simulating the reflection characteristic of an extensive conductive body with respect to an arriving succession of pulses incoming at a predetermined carrier frequency, by means of a repeater having tunable transmitter and receiver parts thereof, said repeater means being remotely positioned from said conductive body, comprising receiving and retransmitting said succession of pulses at said repeater means, transmitting tuning control signals from a point remotely positioned with respect to said repeater, tuning the transmitter and receiver means of said repeater to a predetermined frequency in response to said control signals, and adjusting said repeater tuning in response to said signals to said predetermined carrier frequency, whereby the retransmitted pulses from said repeater means have the same carrier frequency characteristics as the pulses reflected from said extensive conductive body.

References Cited in the file of this patent

UNITED STATES PATENTS

| | | |
|---|---|---|
| 2,014,518 | Beverage | Sept. 17, 1935 |
| 2,076,361 | Beverage | Apr. 6, 1937 |
| 2,134,716 | Gunn | Nov. 1, 1938 |